US007464899B2

(12) United States Patent
Elgersma et al.

(10) Patent No.: US 7,464,899 B2
(45) Date of Patent: Dec. 16, 2008

(54) METHOD AND SYSTEM FOR DETERMINING A SINGULARITY FREE MOMENTUM PATH

(75) Inventors: Michael R. Elgersma, Plymouth, MN (US); Daniel P. Johnson, Fridley, MN (US); Gunter Stein, St. Paul, MN (US); Blaise G. Morton, Minnetonka, MN (US); Dennice F. Gayme, Pasadena, CA (US); Mason A. Peck, Ithaca, NY (US)

(73) Assignee: Honeywell International Inc., Morristown, NJ (US)

( * ) Notice: Subject to any disclaimer, the term of this patent is extended or adjusted under 35 U.S.C. 154(b) by 117 days.

(21) Appl. No.: 11/197,047

(22) Filed: Aug. 3, 2005

(65) Prior Publication Data

US 2007/0029447 A1    Feb. 8, 2007

(51) Int. Cl.
*B64G 1/28*    (2006.01)
(52) U.S. Cl. .......................................... 244/165; 701/13
(58) Field of Classification Search ...................... 701/4, 701/13; 244/158.1, 164, 165
See application file for complete search history.

(56) References Cited

U.S. PATENT DOCUMENTS 5,681,012 A * 10/1997 Rosmann et al. ............. 244/165
6,039,290 A    3/2000 Wie et al.
6,131,056 A   10/2000 Bailey et al.

FOREIGN PATENT DOCUMENTS

EP    06118287    12/2006
WO    9947419    9/1999

OTHER PUBLICATIONS

H. Kurokawa; Constrained Steering Law Of Pyramid-Type Control Moment Gyros And Ground Tests; Journal Of Guidance, Control, And Dynamics, vol. 20, No. 3, May-Jun. 1997, XP-002112653.
S. Krishnan and S.R. Vadali; An Inverse-Free Technique For Attitude Control Of Space Craft Using CMGS; Acta Astronautica, vol. 39, No. 6, pp. 431-438, 1996, XP-002107130.
S. Basu, R. Pollack and M. Roy, "Computing Roadmaps of Semi-Algebraic Sets on a Variety," Journal of the American Mathematical Society, Jul. 20, 1999, pp. 55-82, vol. 13, No. 1.

* cited by examiner

*Primary Examiner*—Timothy D Collins
(74) *Attorney, Agent, or Firm*—Ingrassia, Fisher & Lorenz, P.C.

(57)    ABSTRACT

A method for avoiding singularities in the movement of CMGs in an array of CMGs in a spacecraft includes a first step where a maneuver command to rotate a spacecraft orientation is received. Then, the torque needed to rotate the spacecraft's orientation is determined. Then, the torque is integrated to determine a momentum path. The momentum path is decomposed into a sequence of straight line segments. For each line segment, a unit vector along the straight line segments is determined. Then, it is determined if there is a continuous path connecting a start point and an end point of the line segment in a plane perpendicular to the unit vector. For each point along the path in the plane perpendicular to the unit vector, a set of gimbal angles is determined.

9 Claims, 8 Drawing Sheets

US 7,464,899 B2

METHOD AND SYSTEM FOR DETERMINING A SINGULARITY FREE MOMENTUM PATH

FIELD OF THE INVENTION

This invention relates to the field of spacecraft vehicle control and, more specifically, to a method and system for determining a singularity free momentum path.

BACKGROUND OF THE INVENTION

In order to control the attitude of a spacecraft, various rotating inertia members can be used. One such inertia member is a control moment gyroscope (CMG). A CMG typically comprises a flywheel with a fixed or variable spin rate mounted to a gimbal assembly. The spin axis of the CMG can be tilted by moving the CMG using the gimbal assembly. This motion produces a gyroscopic torque orthogonal to the spin axis and gimbal axis.

To achieve full attitude control of a spacecraft, a minimum of three CMGs, arranged such that each CMG in the CMG array imparts torque about a linearly independent axis, can be used. Typically, additional CMGs are provided for redundancy purposes and to assist with singularity avoidance. A singularity occurs when the momentum vectors of the CMGs line up such that one or more components of the requested torque can not be provided.

Several different techniques have been developed to avoid singularities. In one method it is first noted that a Jacobian A maps the CMG gimbal rates into a three dimensional array torque:

$$A\omega = \tau \quad (1)$$

where A is a 3×n Jacobian matrix, $\omega$ is a n×1 array of gimbal rates for the n gimbals, and $\tau$ is a 3×1 array of torque components to be imparted to the spacecraft. From the above equation and with a known torque command, $\tau$, the individual gimbal rates for each CMG can be calculated. Using the known Moore-Penrose pseudoinverse to invert the Jacobian matrix, a set of possible gimbal rates is:

$$\omega = A^T(AA^T)^{-1}\tau \quad (2)$$

As discussed previously, inherent in the use of CMGs is the possibility that the CMGs' momentum vectors may line up in such a way that a singularity condition is reached. Mathematically, singularities can occur when the eigenvalues of $AA^T$ approach zero, causing $(AA^T)^{-1}$ to go to infinity. Or, equivalently, singularities occur when the determinant of the matrix $AA^T$ is equal to zero (expressed algebraically as det $(AA^T)$ =0). In the case of a 3×n matrix A, this is equivalent to saying the rank of the matrix $AA^T$ is two or less.

Different approaches have been devised to avoid singularities in the movement of CMGs. In one approach, to ensure that $(AA^T)^{-1}$ never is 0, $(AA^T)^{-1}$ is replaced by $(AA^T+\epsilon I)^{-1}$ where I is the identity matrix and $\epsilon$ is a small number. The use of a positive $\epsilon$ ensures that det $(AA^T+\epsilon I)^{-1}$ never becomes 0.

While useful in some instances, a drawback to this approach is that this approach changes the gimbal rate calculation. In the case of the Jacobian A, the use of the pseudoinverse means that gimbal rates are no longer exactly mapped into the commanded torques because of the error $\epsilon$ introduces. This resulting error steers the spacecraft in the wrong direction and can introduce significant, undesired torque, especially near the singularity.

A second approach is to limit the CMG array's momentum output to a smaller area within a momentum envelope. The momentum envelope is the momentum provided in all possible combinations of the CMGs in the CMG array. Depending on the CMG arrangement, by operating within, in one exemplary embodiment, one-third or less of the total momentum envelopes, singularities can be avoided. However, this approach wastes potential torque and results in systems that are much larger and heavier than needed.

Another approach is to utilize steering laws that avoid singularities. Steering laws allow a singularity free momentum path to be determined before moving the CMGs. The difficulty with steering laws is that determining the path is typically a computationally intensive undertaking that results in excessive delay between the command to rotate the spacecraft and the actual initiation of rotation. What is needed is a steering law that can efficiently and quickly determine a singularity free momentum path.

SUMMARY OF THE INVENTION

In an exemplary embodiment, a method for avoiding singularities in the movement of CMGs in an array of CMGs in a spacecraft is disclosed. First, a maneuver command to rotate the spacecraft orientation is received. Then, a torque needed to rotate the spacecraft's orientation is determined. Next, the torque is integrated to determine a momentum path The momentum path is then decomposed into a sequence of straight line segments. For each line segment, a unit vector along the straight line segments is determined. Then, it is determined if there is a continuous path connecting a start point and an end point of the line segment in a plane perpendicular to the unit vector. For each point along the path in the plane perpendicular to the unit vector, a set of gimbal angles is determined.

In another exemplary embodiment, a control system for a spacecraft is provided. The control system includes an attitude control system operable to receive a maneuver command to rotate a spacecraft orientation, compute the torque needed to rotate the spacecraft orientation, integrate the torque to determine a momentum path, approximate the momentum path with a sequence of straight line segments, determine a unit vector along the straight line for each line segment, and determine if there is a continuous path connecting a start point and an end point of the line segment in a plane perpendicular to the unit vector. The control system also includes a momentum actuator control processor coupled to the attitude control system. The momentum actuator control system is configured to determine a set of gimbal angles, for each point along the path in the plane perpendicular to the unit vector. The control system further comprises a plurality of control moment gyroscopes coupled to the momentum actuator and configured to receive commands from the momentum actuator to rotate the spacecraft orientation.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following detailed description describes the use of the present invention in terms of its use in an exemplary CMG array singularity avoidance system. However, applications of the present invention are not limited to any one specific application or embodiment, but are useful in many different areas of endeavor.

Figure 1:
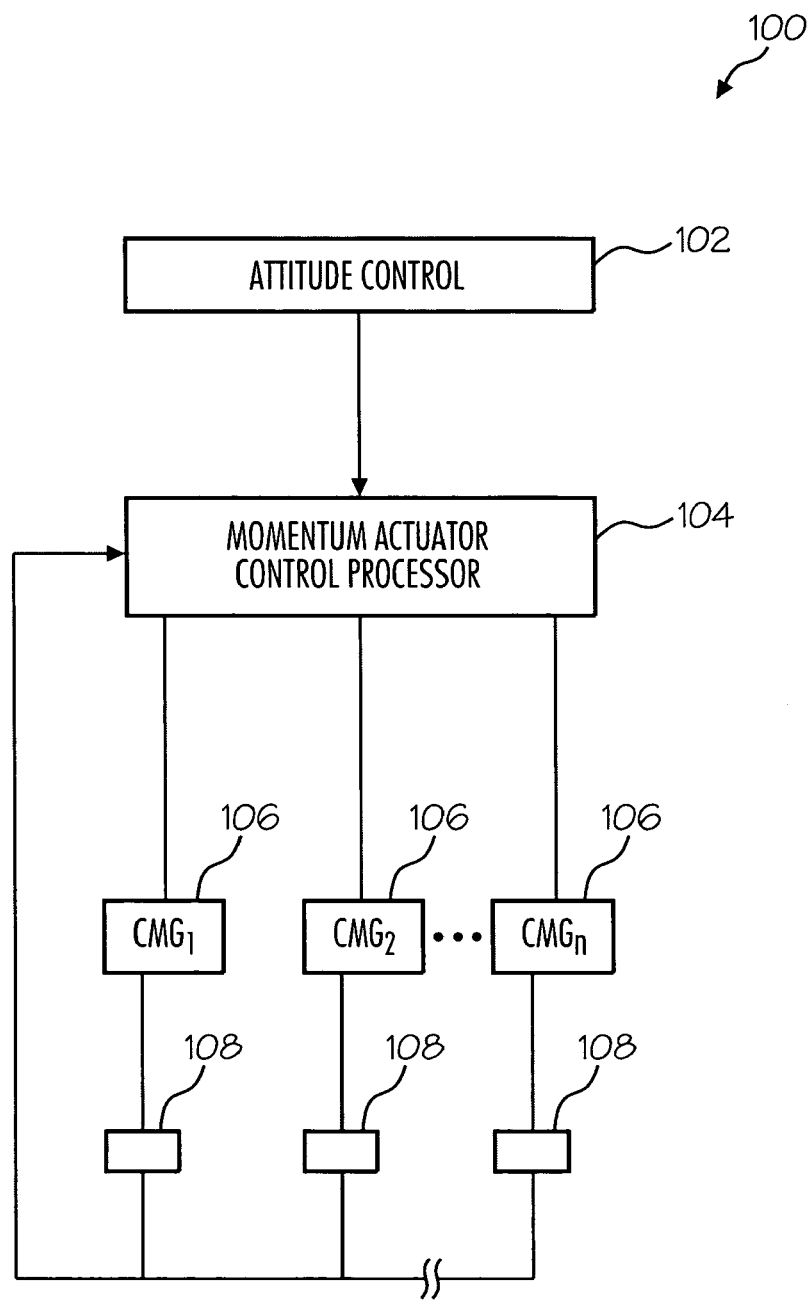
FIG. 1 is a block diagram illustrating an exemplary CMG control system in accordance with the teachings of the present invention.

An exemplary control system 100 for implementing the present invention is illustrated in FIG. 1. The components of the control system 100 are known in the art and can be assembled in different ways using different processors, software, controllers, sensors, and the like. Additionally, various computational functionalities that are typically provided by one part of the system can instead be provided by another part. The system 100 as shown in FIG. 1 includes parts that are pertinent to the discussion of the present invention and the system 100 may include other elements or systems that might be provided in a control system and which are well known and not shown in FIG. 1.

The control system 100 includes an attitude control system 102 coupled to a momentum actuator control processor 104. CMGs 106 are coupled the momentum actuator control processor 104. Associated with each CMG 106 are one or more CMG sensors 108 for providing information concerning the state of the CMG 106 to the control system. Control system 100, in one embodiment, is mounted on a spacecraft such as an orbiting satellite.

Attitude control system 102 controls the positioning of a spacecraft. The attitude control system 102 receives data concerning a desired spacecraft maneuver and determines an appropriate torque command to complete the desired maneuver. The torque commands can be presented to the momentum actuator control processor 104. The momentum actuator control processor 104, in response to the torque commands, can calculate the gimbal rates necessary to produce the commanded torque. Additionally, the momentum actuator control processor 104 can calculate gimbal movement from a momentum path determined by a steering law.

The momentum actuator control processor 104, based on the above identified calculations, provides the necessary commands to the CMGs 106 such that the CMG movement produces the commanded torque and, in accordance with the teachings of the present invention, provides the torque while avoiding singularities.

Figure 2:
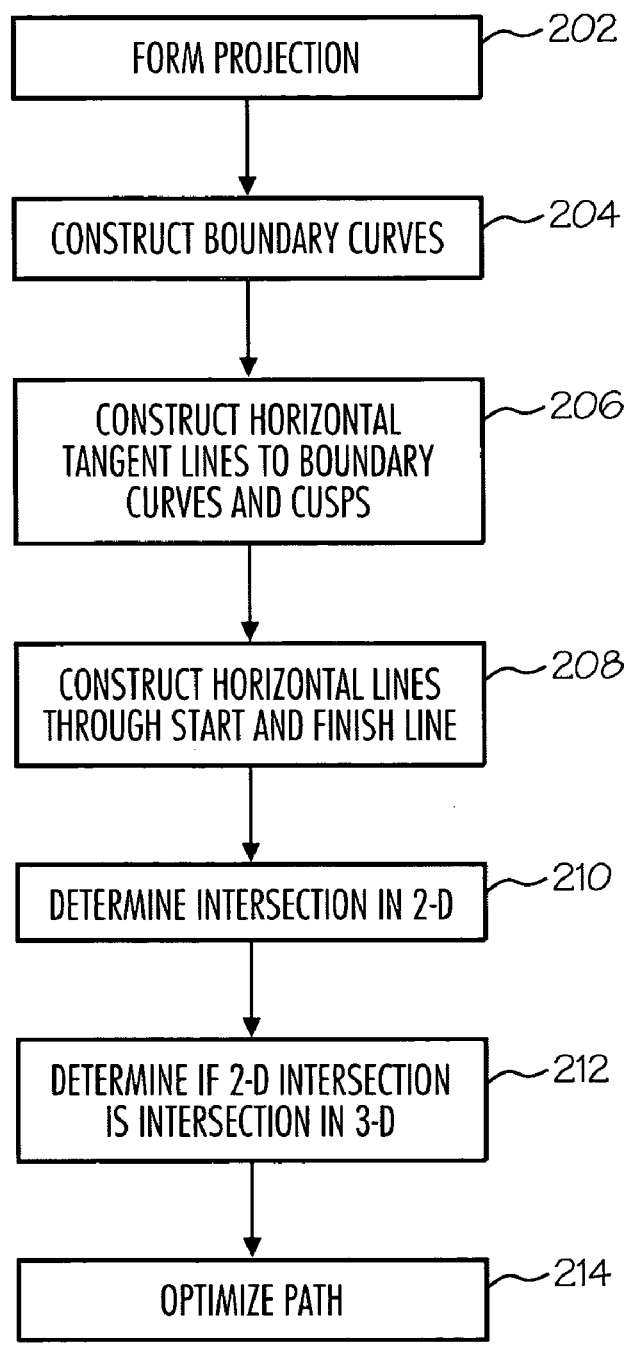
FIG. 2 is a flowchart of a roadmap algorithm for use in CMG path planning, in accordance with the teachings of the present invention.

FIG. 2 is a flowchart of an exemplary embodiment of a method 200 that provides a straight path in momentum space that avoids singularities and provides corresponding path in gimbal angle space for, in this example, a set of four CMGs aligned on the faces of a four-sided pyramid. Three CMGs are needed to have three degrees of freedom and the fourth CMG can be used for redundancy purposes and to help avoid singularities.

In a first step, step 202, the three dimensional momentum space formed by the motion of the four CMGs is decomposed into a two-dimensional projection. First, note that the given momentum for all four CMGs is:

$$h = h_1 + h_2 + h_3 + h_4 \qquad (3)$$

where each subscript represents an individual CMG. In this method, the commanded momentum path lies on the line:

$$h(t) = h_0 + t^*w \qquad (4)$$

where $h_0$ is a point on the momentum line, t is a scalar quantity that moves along the line (e.g. a time parameter) and w is a unit vector along the direction of the line.

Setting equations 3 and 4 equal yields:

$$h_1 + h_2 + h_3 + h_4 = h_0 + t^*w \qquad (5)$$

Since w is a unit vector along the line, w_perp can be defined as a projection onto the planes orthogonal to w. For example, if w is a unit vector that moves in the x-axis, then w_perp is the y and z plane.

Multiplying both sides of Eqn. 5 by the transpose of w_perp yields:

$$w\_perp'^*(h_1+h_2) = w\_perp'^*(h_0-(h_3+h_4)) \qquad (6)$$

since w_perp'*w=[0,0].

Eqn. 6 represents a two dimensional projection of the momentum envelop of the CMGs. In the projection, both $h_1+h_2$ and $h_0-(h_3+h_4)$ are projected onto the w_perp plane. As the momentum path moves along a line in the w plane, any movement of $h_1+h_2$ in the w_perp plane must be exactly cancelled by the movement of $h_3+h_4$ in the w_perp plane since Eqn. 4 requires that all momentum be along the straight line. Therefore, areas where projection of $h_1+h_2$ overlaps with the projection of $h_0-(h_3+h_4)$ in the w_perp plane are possible areas where a momentum path exists along the w line, with constant w_perp'*$h_0$ net momentum in the two dimensional space perpendicular to w.

Figure 3:
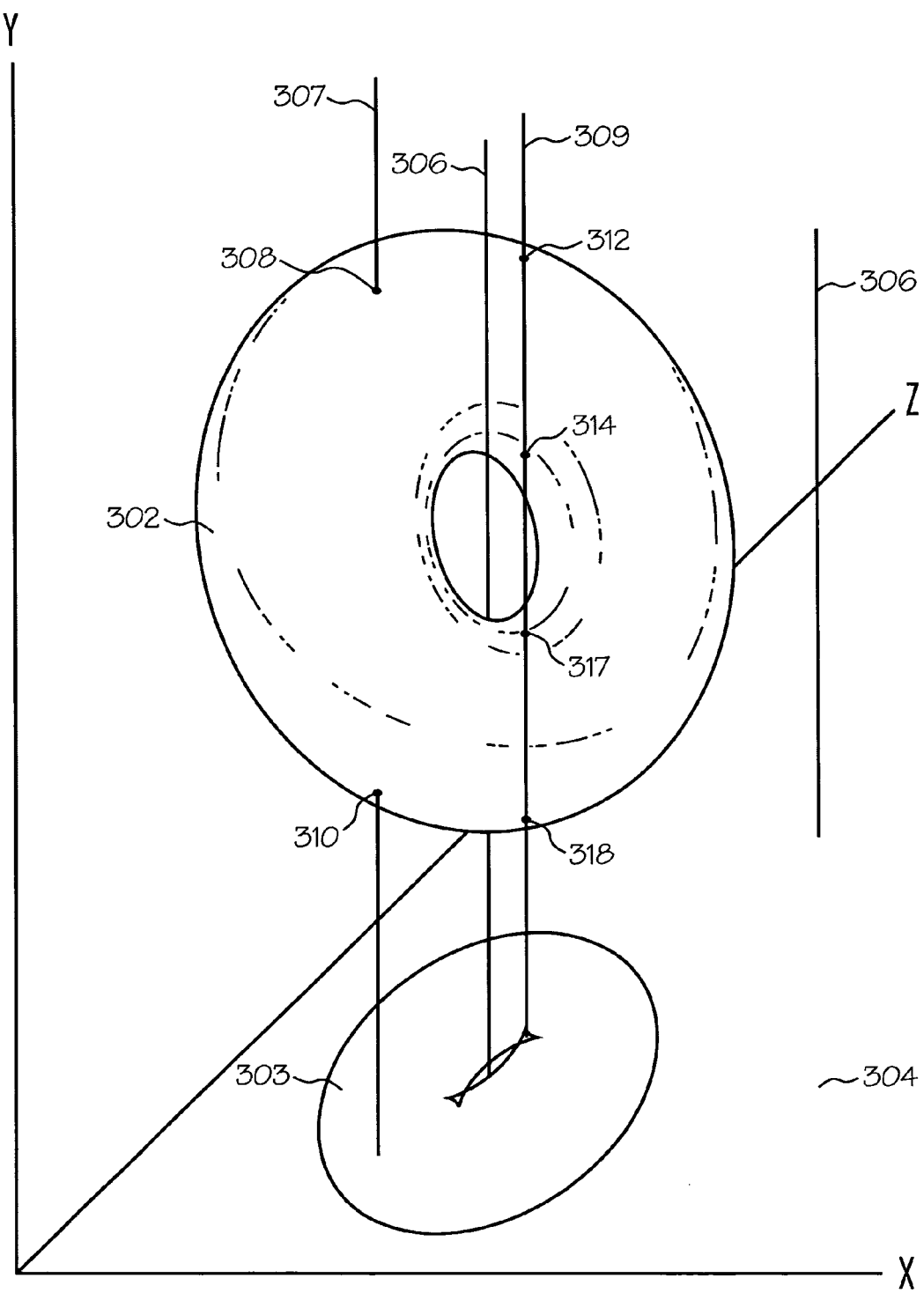
FIG. 3 illustrates a torus shaped momentum envelope projected to a plane in accordance with an exemplary embodiment of the present invention.

As an example of the projection of $h_1+h_2$ onto the w_perp plane, note that the momentum, $h_1$, of a first CMG lies on a circle and the momentum, $h_2$, of a second CMG lies on another circle. In this exemplary embodiment, the relative speeds of the flywheel of the CMGs are such that together $h_1+h_2$ can form a donut shaped figure that is commonly referred to as a torus. Turning to FIG. 3, a torus 302 represents the momentum space formed by $h_1+h_2$. In FIG. 3, the torus 302 is projected onto a two-dimensional momentum envelope 304 to form a momentum projection 303. A vertical line can pierce the torus 302 at 0, 2, or 4 places. For example, if a first line 306 is outside the torus 302 or through the hole of the torus 302, then the first line 306 intersects the torus 302 in 0 places. A second line 307 intersects the torus 302 surface two places point 308 and 310. Additionally, a third line 309 can enter the torus 302 and pass through two points and then continues through the hole and out to an opposite side of the torus 302, where the line will then pierce the torus in two more places, for a total of four places. For example, the third line 309 can intersect the torus 302 at point 312, point 314, point 316, and point 318.

To determine the number of places a line can intersect a momentum envelope, given any point (y, z) in the projection plane, the angles $\theta_1$ and $\theta_2$ can be solved for using w_perp'*$(h_1(\theta_1)+h_2(\theta_2))$=[y, z]. Solving these equations produces a fourth-order polynomial that has four solutions over the field of complex numbers. Ignoring the complex (nonphysical) solution results in the conclusion that there can be 0, 2 or 4 real solutions, which corresponds in three dimensional space to the number of points where a line intersects the momentum envelope.

Figure 4:
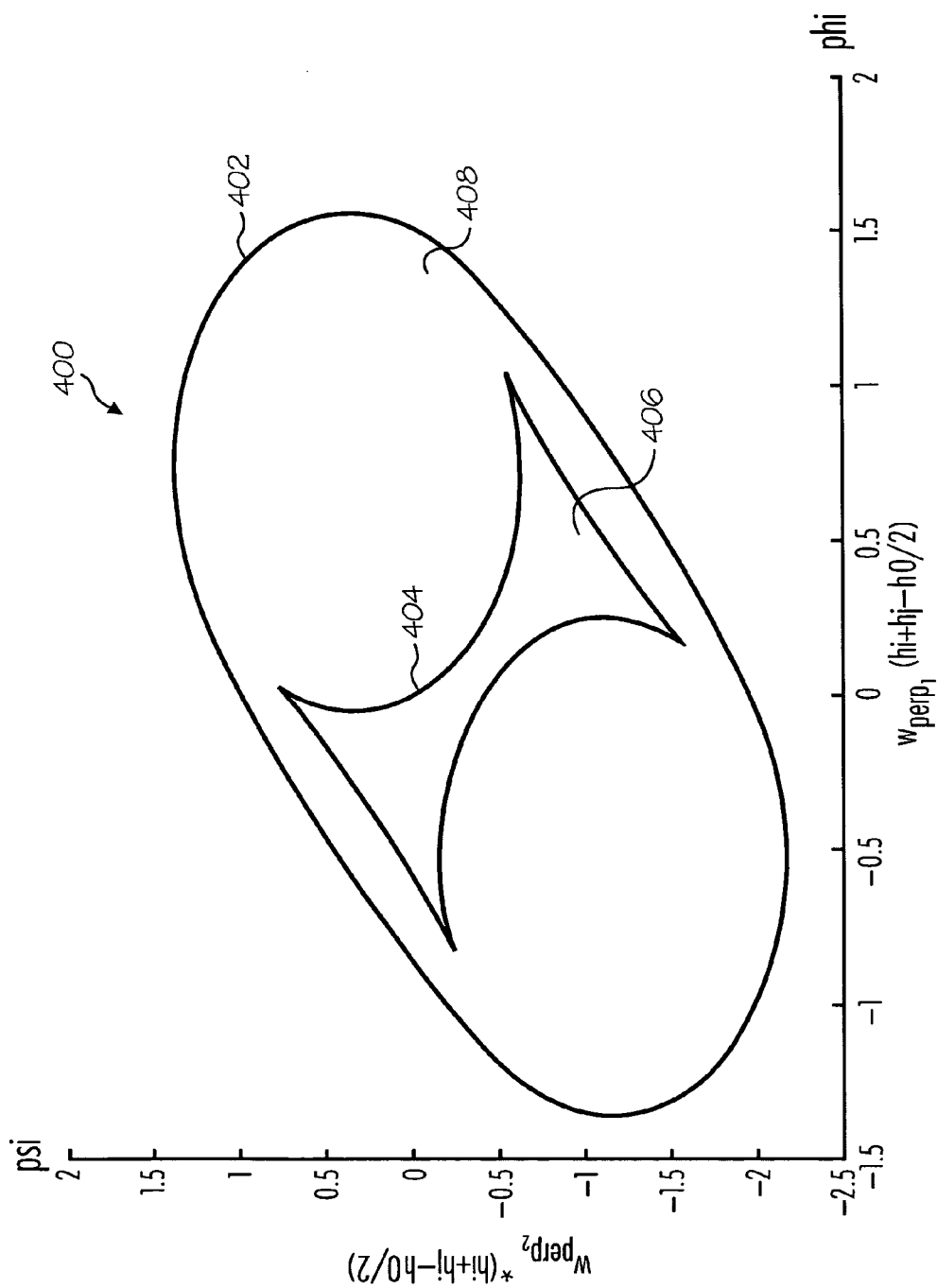
FIG. 4 illustrates the projection of a momentum envelope for w_perp'*($h_1+h_2$) in accordance with the teachings of the present invention.

Turning to FIG. 4, FIG. 4 illustrates a projection 400 of w_perp'*$(h_1+h_2)$ for a particular CMG arrangement. The projection 400 includes an outer boundary 402 and an inner boundary 404. The boundaries separate regions of differing solutions to w_perp'*$(h_1(\theta_1)+h_2(\theta_2))$=[y, z]. In a first region 406 enclosed by inner boundary 404, there are four real solutions. In a second region 408 between inner boundary 404 and the outer boundary 402, there are two real solutions. Outside the outer boundary 402, there are no real solutions.

Figure 5:
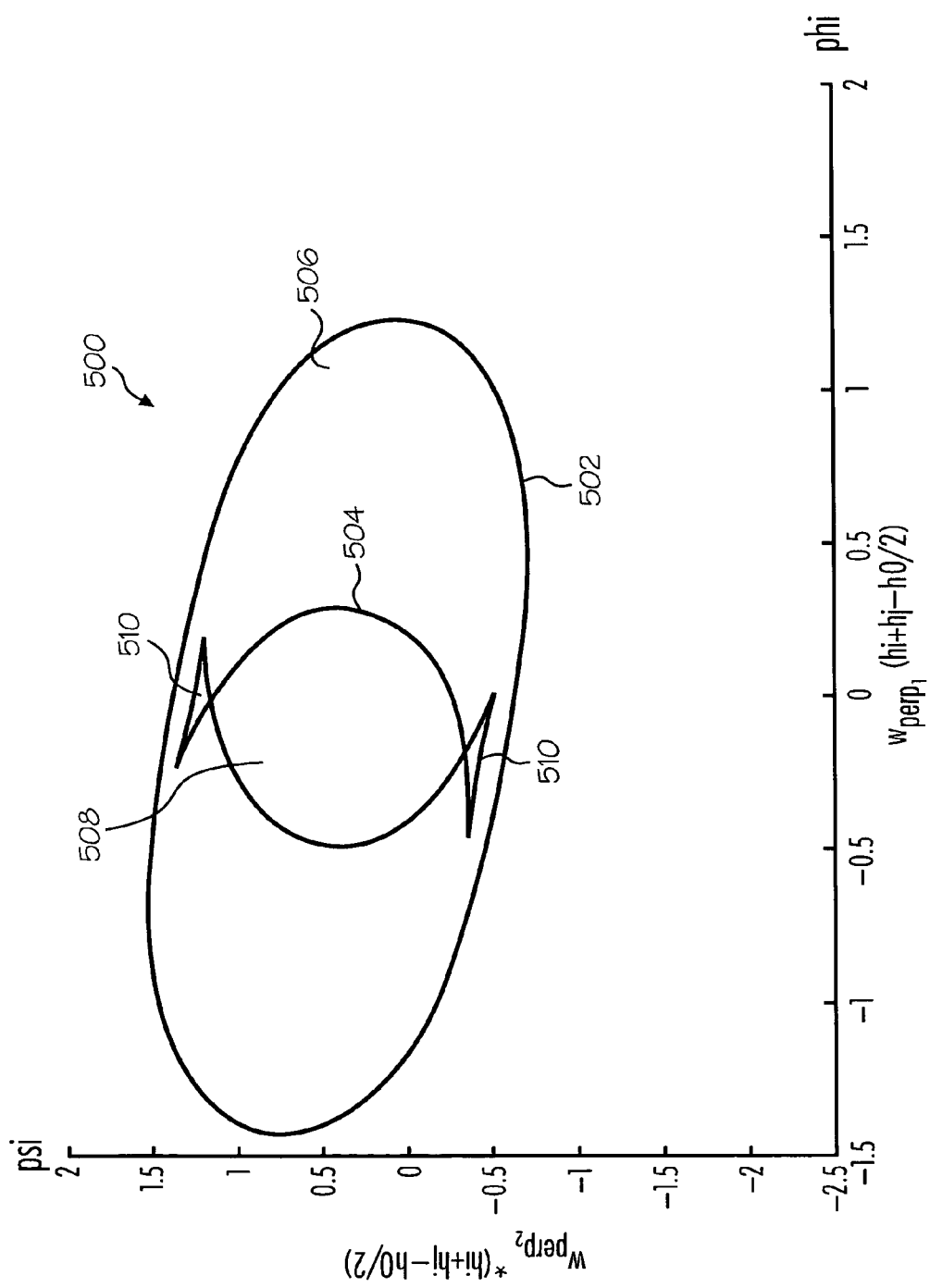
FIG. 5 illustrates the projection of a momentum envelope for w_perp'*($h_0-(h_3+h_4)$) in accordance with the teachings of the present invention.

FIG. 5 illustrates an exemplary projection 500 of w_perp'*$(h_0-(h_3+h_4))$. The boundaries separate regions of differing solutions to w_perp'*$(h_0-(h_3(\theta_3)+h_4(\theta_4)))$=[y, z]. In FIG. 5, there is an outer boundary 502, and an inner boundary 504, which crosses over itself at two ends. In a first region, 506 between the outer boundary 502 and the inner boundary 504 there are two real solutions. In a second region 508, which is relatively elliptical and enclosed by the inner boundary, there are no real solutions. In the third regions 510, which are somewhat triangular and enclosed by the inner boundary 504, there are four real solutions.

Figure 6:
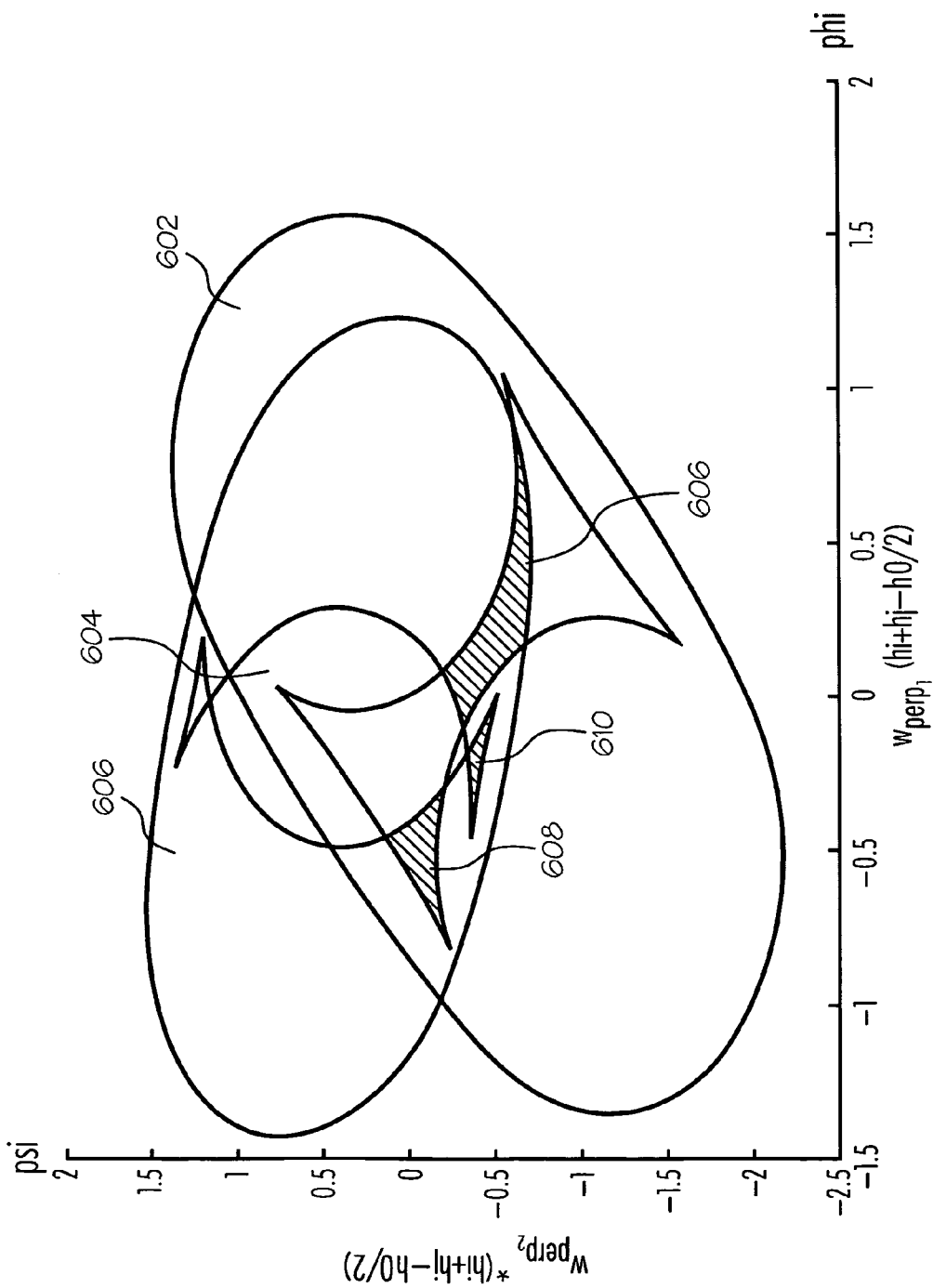
FIG. 6 illustrates FIG. 4 and FIG. 5 combined in accordance with the teachings of the present invention.

Of course, as discussed above, the area of interest is the overlap of the two projections. FIG. 6 illustrates the projection of FIG. 4 and the projection of FIG. 5. A first area 602 represents an area where solutions for the w_perp'*$(h_1+h_2)$ projection and the w_perp'*$(h_0-(h_3+h_4))$ projection overlap. Since each $h_i$ traces out a circle centered at the origin, w_perp'*$(h_i+h_j)$ is centered at the origin, and w_perp'*$h_0$ is the separation between the centers of the two doughnut shaped regions. Specifically, the first area 602 represents the overlap of the second region 408 of projection 400 and the first region 506 of projection 500. Areas where there is either no overlap such as second region 604 or where an area of zero solutions overlaps with an area of two or four solutions such as third region 606, there are no solutions. A fourth area 608 represents the overlap of the first region 406 of projection 400 and the first region 506 of the second projection 500. A fifth area 610 represents the overlap of the second region 408 of projection 400 and the third region 510 of the second projection 500.

Since different regions have different numbers of solutions, when moving along the momentum line, if the path in the w_perp plane starts in an area having more solutions than the area the path stops in, if the wrong path is chosen initially, there may not be a continuous solution between the two regions and a different path may need to be chosen to reach the endpoint This is an example of a gimbal lock inside the momentum space.

Turning back to FIG. 2, in step 204, the first parts of the roadmap are generated when the boundary curves for the w_perp'*$(h_1+h_2)$ and w_perp'*$(h_0-(h_3+h_4))$ regions are constructed. The boundary curves are defined as boundaries that separate regions having different numbers of solutions. Mathematically, they can be found by letting $h_i$ be the angular momentum of $i^{th}$ CMG and $\|h_i\|$ the constant momentum magnitude. Each momentum vector, $h_i$, moves along a circle. Let $e_i$ be the constant unit vector perpendicular to plane containing that circle, so $e_i'*h_i$=0.

Given a momentum line, $h=h_0+w*t$, the momentum perpendicular to that line must be zero, so w_perp'*$(h_1+h_2+h_3+h_4)$=w_perp'*$h_0$, since $$\text{w\_perp}' * w = \begin{bmatrix} 0 \\ 0 \end{bmatrix}.$$

This implies that the w_perp'*$(h_1+h_2)$=w_perp'*$(h_0-(h_3+h_4))$. Since each $h_i$ moves along a circle, combinations, of two of them give a two-dimensional region. In the plane perpendicular to w, the two-dimensional region swept out by [y,z]= w_perp'*$(h_1+h_2)$, is bounded by two curves. These two one-dimensional curves are where the function of two variables is singular, so that instead of giving a two-dimensional region, the function degenerates to a one-dimensional boundary curve. A function of two variables is singular when the two-by-two Jacobian matrix is singular. The function [y,z]= w_perp'*$(h_i+h_j)$ has Jacobian matrix [dy,dz]=w_perp'*$(dh_i+dh_j)$ where $dh_i=e_i \times h_i$ is the vector perpendicular to $h_i$ in the direction that $h_i$ changes as $h_i$ moves along its circle. The Jacobian is singular if-and-only-if there exists a two-dimensional unit vector $v_{ij}$ (so $v_{ij}$ lies on a circle) that the Jacobian sends to zero, i.e., $$v_{ij}'*\text{w\_perp}'*[e_i \times h_i e_j \times h_j]=[0\ 0]. \tag{7}$$

Similarly, the function [y,z]=w_perp'*$(h_0-(h_3+ \ldots +h_n))$ has Jacobian matrix [dy,dz]=−w_perp'*$(h_3+ \ldots +dh_n)$, which is singular if-and-only-if there exists a two-dimensional unit vector $v_{3 \ldots n}$ (so $v_{3 \ldots n}$ lies on a circle) that the Jacobian sends to zero, i.e., $$v_{3 \ldots n}'*\text{w\_perp}'*[e_2 \times h_3 \ldots e_n \times h_n]=[0 \ldots 0] \tag{8}$$

But, for any three vectors, a, b, c, the vector identity, a'*(b×c)=det[a b c], can be used with a=w_perp*$v_{ij}$, b=$e_i$, and c=$h_j$ to convert each half of the above equation to:

$$0 = v_{ij}' * \text{w\_perp}' * (e_i \times h_i) = (\text{w\_perp} * v_{ij})' * (e_i \times h_i) \tag{9}$$

$$= \det[\text{w\_perp} * v_{ij} e_i h_i]$$

$$= -h_i' * (e_i \times (\text{w\_perp} * v_{ij}))$$

Thus, $h_i$ is orthogonal to $e_i \times (\text{w\_perp}*v_{ij})$, and $h_i$ is orthogonal to $e_i$, so $h_i$ is in the direction of the cross-product of those two vectors. So unit vectors in those directions are equal, up to a possible sign change:

$$\frac{h_i}{\|h_i\|} = \pm \frac{e_i \times (e_i \times (\text{w\_perp} * v_{ij}))}{\|e_i \times (e_i \times (\text{w\_perp} * v_{ij}))\|} \tag{10}$$

Multiplying this equation by w_perp gives:

$$\text{w\_perp}' * h_i = \pm \|h_i\| \frac{\text{w\_perp}' * (e_i \times (e_i \times (\text{w\_perp} * v_{ij})))}{\|e_i \times (e_i \times (\text{w\_perp} * v_{ij}))\|} \tag{11}$$

$$= \pm \|h_i\| \frac{\text{w\_perp}' * (I - e_i * e_i') * \text{w\_perp} * v_{ij}}{\sqrt{v_{ij}' * \text{w\_perp}' * (I - e_i * e_i') * \text{w\_perp} * v_{ij}}}$$

where the last equality used the following vector identities, with any vectors b, c, and unit vector e:

$$e \times (e \times b) = -(I - e*e')*b$$

$$(I - e*e')*(I - e*e') = (I - e*e')$$

$$\|c\| = \sqrt{c'*c} \tag{12}$$

A two-by-two symmetric matrix, $A_i$, can be defined as:

$$A_i = w\_perp'*(I - e_i*e_i')*w\_perp \tag{13}$$

Using this matrix in the last $w\_perp'*h_i$ equation gives:

$$w\_perp' * h_i = \pm \|h_i\| \frac{A_i * v_{ij}}{\sqrt{v_{ij}' * A_i * v_{ij}}} \tag{14}$$

The inner and outer (use + and − signs below) boundary curves of the $w\_perp'*(h_1+h_2)$ region are given by moving $v_{12}$ around on a circle and computing:

$$w\_perp' * (h_1 + h_2) = \|h_1\| \frac{A_1 * v_{12}}{\sqrt{v_{12}' * A_1 * v_{12}}} \pm \|h_2\| \frac{A_2 * v_{12}}{\sqrt{v_{12}' * A_2 * v_{12}}} \tag{15}$$

The inner and outer (use + and − signs below) boundary curves of the $w\_perp'*(h_0-(h_3+h_4))$ region are given by moving $V_{34}$ around on a circle and computing $$w\_perp' * (h_0 - (h_3 + h_4)) = \tag{16}$$

$$w\_perp' * h_0 - \|h_3\| \frac{A_3 * v_{34}}{\sqrt{v_{34}' * A_3 * v_{34}}} \pm \|h_4\| \frac{A_4 * v_{34}}{\sqrt{v_{34}' * A_4 * v_{34}}}$$

The $2^{n-3}$ (use all sign choices below) boundary curves of the $w\_perp'*(h_0-(h_3+\ldots+h_n))$ region are given by moving $v_{3\ldots n}$ around on a circle and computing $$w\_perp' * (h_0 - (h_3 + \ldots h_n)) = \tag{17}$$

$$w\_perp' * h_0 - \sum_{i=3}^{n} \pm \|h_i\| \frac{A_i * v_{3\ldots n}}{\sqrt{v_{3\ldots n}' * A_i * v_{3\ldots n}}}$$

While computing the curves for $w\_perp'*(h_1+h_2)$ region and $w\_perp'*(h_0-(h_3+h_4))$ region, intersections of curves are saved, and cusp points of curves are saved, for later use in roadmap computations.

Figure 7:
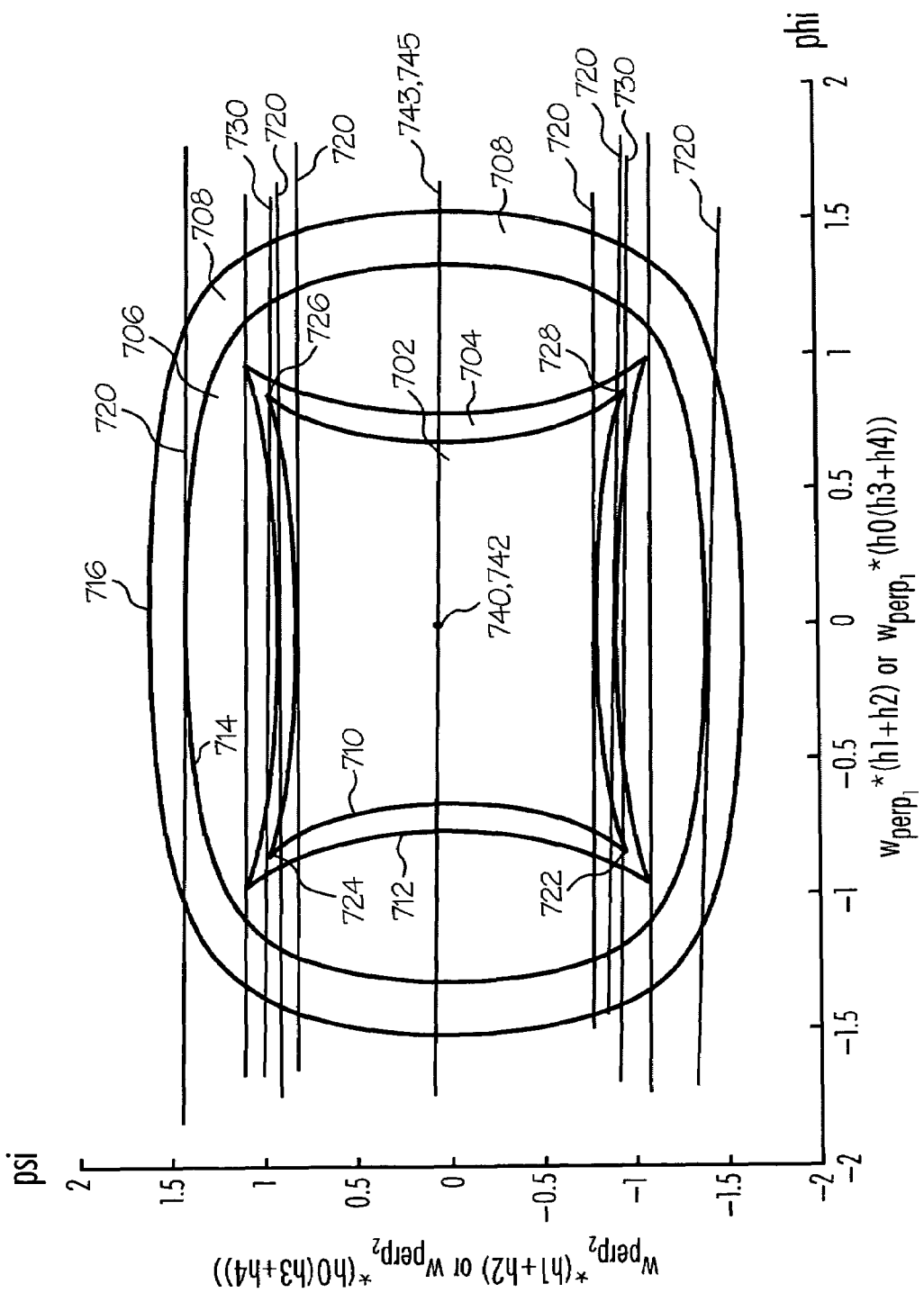
FIG. 7 illustrates the forming of roads and intersection points in a projection of the momentum envelope of a CMG array in accordance with the teachings of the present invention.

Turning to FIG. 7, FIG. 7 illustrates another arrangement of four CMGs with a w_perp projection of $h_1+h_2$ and $h_0-(h_3+h_4)$. In this example, the values of $h_1$, $h_2$, $h_3$, and $h_4$ differ from those of FIGS. 4-6. The projection of $w\_perp'*(h_1+h_2)$ is represented by the solid line and the projection of $w\_perp'*(h_0-(h_3+h_4))$ by dashed lines. There are four regions. First region 702 has a total of 16 solutions, a second region 704 has 8 solutions, a third region 706 has 4 solutions and a fourth region 708 has 0 solutions. As can be seen, a first boundary curve 710 separates the first and second region, a second boundary curve 712 separates the second region and the third region, a third boundary curve 714 separates the third region 706 and the fourth region 708 and a fourth boundary curve 716 separates the fourth region 708 from points exterior to the projection.

The boundary curves operate as roads or paths in the projection. Travel from one region to another can be accomplished by moving along a boundary curve until another boundary curve or intersecting road or path is reached. In FIG. 6, the boundary curves intersect. In FIG. 7, the boundary curves do not intersect. This does not mean there are no paths from one region to another in FIG. 7. It implies that additional roads are needed in the roadmap.

In step 206, additional roads for the roadmap are determined by constructing horizontal tangent lines that connect boundary curves. The tangent lines are constructed to be tangent to the boundary curves. Since the tangent lines are horizontal, they will be tangent to boundary curves at local maximums and minimums. In FIG. 7, exemplary horizontal tangent lines 720 intersecting the boundary curves are illustrated Additionally, horizontal lines are drawn through any cusps of the boundary curves. A cusp is defined as a point where the direction of the boundary curve changes abruptly. As seen in FIG. 7, first boundary curve 710 has a first cusp 722, a second cusp 724, a third cusp 726, and a fourth cusp 728. Cusp lines 730 are drawn through the cusps.

The cusps points, where the curve changes direction abruptly, can be computed by first noting that the formulas for boundary curves of the two-dimensional $[y,z]=w\_perp'*(h_1+h_2)$ are given by:

$$w\_perp' * (h_1 + h_2) = \|h_1\| \frac{A_1 * v_{12}}{\sqrt{v_{12}' * A_1 * v_{12}}} \pm \|h_2\| \frac{A_2 * v_{12}}{\sqrt{v_{12}' * A_2 * v_{12}}} \tag{18}$$

In order for the curve to change direction abruptly, all components of its derivative must go to zero. In order to compute the derivative of the right-hand side of the above equation, with respect to the two-dimensional unit-vector parameter, $v_{12}$, we need to evaluate:

$$\frac{d}{dv}\left(\frac{A*v}{\sqrt{v'*A*v}}\right) \tag{19}$$

where $A' = A$ and $v'*v = 1$

Since $v'*v=1$, the change of v must be perpendicular to v:

$$\frac{d\left(\frac{v}{\|v\|}\right)}{dv} = \frac{\|v\|^2 I - v*v'}{\|v\|^3} = I - v*v' \tag{20}$$

so $$\frac{d}{dv}\left(\frac{A*v}{\sqrt{v'*A*v}}\right) = \frac{[(v'*A*v)*A - A*v*v'*A]*(I-v*v')}{(v'*A*v)^{3/2}} \tag{21}$$

The 2×2 matrix expression, $(v'*A*v)*A-A*v*v'*A$, in the above equation can be simplified by multiplying out all scalar terms, using $$v = \begin{bmatrix} v_1 \\ v_2 \end{bmatrix} \text{ and } A = \begin{bmatrix} a_{11} & a_{12} \\ a_{21} & a_{22} \end{bmatrix},$$

obtaining:

$$(v'*A*v)*A - A*v*v'*A = \qquad (22)$$
$$(a_{11}a_{22} - a_{12}a_{21})*\begin{bmatrix} v_2v_2 & -v_1v_2 \\ -v_2v_1 & v_1v_1 \end{bmatrix} = \det(A)*(\|v\|^2 I - v*v')$$

Using this identity in the previous equation, and noting that $\|v\|^2=1$ and $(I-v*v')*(I-v*v')=(I-v*v')$ gives:

$$\frac{d}{dv}\left(\frac{A*v}{\sqrt{v'*A*v}}\right) = \frac{[(v'*A*v)*A - A*v*v'*A]*(I-v*v')}{(v'*A*v)^{3/2}} \qquad (23)$$
$$= \frac{[\det(A)*(I-v*v')]*(I-v*v')}{(v'*A*v)^{3/2}}$$
$$= \frac{\det(A)*(I-v*v')}{(v'*A*v)^{3/2}}$$

Using this type of expression for both $A_1$ and $A_2$ parts of curve equation, gives the conditions for curve cusps, which occur where the derivative of curve is zero:

$$\begin{bmatrix} 0 & 0 \\ 0 & 0 \end{bmatrix} = \frac{d}{dv}\begin{bmatrix} \|h_1\|\frac{A_1*v_{12}}{\sqrt{v'_{12}*A_1*v_{12}}} \pm \\ \|h_2\|\frac{A_2*v_{12}}{\sqrt{v'_{12}*A_2*v_{12}}} \end{bmatrix} \qquad (25)$$
$$= \begin{bmatrix} \|h_1\|\frac{\det(A_1)}{(v'_{12}*A_1*v_{12})^{3/2}} \pm \\ \|h_2\|\frac{\det(A_2)}{(v'_{12}*A_2*v_{12})^{3/2}} \end{bmatrix}*(I-v_{12}*v'_{12})$$

Therefore, the scalar that multiplies matrix $(I-v_{12}*v_{12}')$ must be zero. Outer boundary curve corresponds to + sign in above formula, and the sum of two positive terms cannot be zero, so outer boundary curve cannot have any cusps. Inner boundary curve corresponds to − sign in above formula, so cusps occur on inner boundary curve where:

$$0 = \|h_1\|\frac{\det(A_1)}{(v'_{12}*A_1*v_{12})^{3/2}} - \|h_2\|\frac{\det(A_2)}{(v'_{12}*A_2*v_{12})^{3/2}} \qquad (26)$$

Multiplying above equation by $(v_{12}'*A_1*v_{12})^{3/2}*(v_{12}'*A_2*v_{12})^{3/2}$ gives:

$$\|h_1\|*\det(A_1)*(v_{12}'*A_2*v_{12})^{3/2} = \|h_2\|*\det(A_2)*(v_{12}'*A_1*v_{12})^{3/2} \qquad (27)$$

Raising both sides to the ⅔ power gives:

$$(\|h_1\|*\det(A_1))^{2/3}*(v_{12}'*A_2*v_{12}) = (\|h_2\|*\det(A_2))^{2/3}*(v_{12}'*A_1*v_{12}) \qquad (28)$$

Letting $c_i=(\|h_i\|*\det(A_i))^{2/3}$, then factoring out $v_{12}'$ on the left and $v_{12}$ on the right gives:

$$0 = v_{12}'*(c_1*A_2 - c_2*A_1)*v_{12} \qquad (29)$$

To solve this equation for $v_{12}$, let the eigen-decomposition of the 2×2 symmetric matrix be:

$$c_1*A_2 - c_2*A_1 = U'*\begin{bmatrix} \lambda_1 & 0 \\ 0 & \lambda_2 \end{bmatrix}*U \qquad (30)$$

With $$\begin{bmatrix} p_1 \\ p_2 \end{bmatrix} = U*v_{12},$$

cusp equation becomes:

$$0 = v'_{12}*U'*\begin{bmatrix} \lambda_1 & 0 \\ 0 & \lambda_2 \end{bmatrix}*U*v_{12} = \qquad (31)$$
$$\begin{bmatrix} p_1 \\ p_2 \end{bmatrix}'*\begin{bmatrix} \lambda_1 & 0 \\ 0 & \lambda_2 \end{bmatrix}*\begin{bmatrix} p_1 \\ p_2 \end{bmatrix} = \lambda_1*(p_1)^2 + \lambda_2*(p_2)^2$$

This equation has solutions if and only if $\lambda_1$ and $\lambda_2$ have opposite signs, since $$p_1 = \pm\sqrt{\frac{-\lambda_2}{\lambda_1}}\, p_2.$$

Let $\lambda_1$ be the largest eigenvalue, then if $\lambda_2$ is negative, the four cusp solutions for unit vector $v_{12}$ are:

$$v_{12} = U'*\begin{bmatrix} p_1 \\ p_2 \end{bmatrix} = U'*\begin{bmatrix} \pm\sqrt{\frac{-\lambda_2}{\lambda_1-\lambda_2}} \\ \pm\sqrt{\frac{\lambda_1}{\lambda_1-\lambda_2}} \end{bmatrix} \qquad (32)$$

Similarly, cusps on the inner boundary curve of the $w\_perp'*(h_0-(h_3+h_4))$ region are given by solutions of:

$$0 = v_{34}'*(c_3*A_4 - c_4*A_3)*v_{34} \qquad (33)$$

Once the cusps are determined, horizontal lines can be drawn through the cusps, forming additional roads that connect boundary curves.

Similarly, extending to N CMGs, cusps on the inner boundary curve of the $w\_perp'*(h_0-(h_3+\ldots+h_n))$ region are given solutions of:

$$0 = \|h_3\|\frac{\det(A_3)}{(v'_{3\ldots n}*A_3*v_{3\ldots n})^{3/2}} \pm \|h_4\|\frac{\det(A_4)}{(v'_{3\ldots n}*A_4*v_{3\ldots n})^{3/2}} \pm \ldots \pm \qquad (34)$$
$$\|h_n\|\frac{\det(A_n)}{(v'_{3\ldots n}*A_n*v_{3\ldots n})^{3/2}}$$

Multiplying above equation by $(v_{3\ldots n}'*A_3*v_{3\ldots n})^{3/2}*\ldots*(v_{3\ldots n}'*A_n*v_{3\ldots n})^{3/2}$ gives:

$$0 = \|h_3\|*\det(A_3)*[(v_{3\ldots n}'*A_4*v_{3\ldots n})^{3/2}\ldots(v_{3\ldots n}'*A_n*v_{3\ldots n})^{3/2}] \pm \ldots \pm \|h_n\|*\det(A_n)*[(v_{3\ldots n}'*A_3*v_{3\ldots n})^{3/2}\ldots(v_{3\ldots n}'*A_{n-1}*v_{3\ldots n})^{3/2}] \qquad (35)$$

Raising both sides of such equations to the ⅔power, rearranging, and raising to the ⅔power again, repeating the process n−3 times, gives a very high (somewhere around a $2^{n-2}$) degree polynomial in the ratio of the two components of the unit vector $v_{3 \ldots n}$. Forming and solving such high order polynomials is very difficult for n>4, so cusps of the boundary curves, $$w\_perp' * (h_0 - (h_3 + \ldots h_n)) = w\_perp' * h_0 - \sum_{i=3}^{n} \pm \|h_i\| \frac{A_i * v_{3 \ldots n}}{\sqrt{v'_{3 \ldots n} * A_i * v_{3 \ldots n}}} \quad (36)$$

should instead be computed by noting when the direction of the curve changes abruptly, as the curve is being calculated numerically, as $v_{3 \ldots n}$ traces out a unit circle.

With these additional "roads" movement from one boundary curve to another can be done by moving along the boundary curve until a tangent line is reached and then traveling along the tangent line to another boundary curve. In addition to the lines constructed in the last step, additional lines are needed to connect the starting points and the ending points with the boundary curves, tangent lines and cusp lines. Therefore, in step 208, a horizontal line 743 is constructed from a starting point 740 across all of the boundary curves and horizontal line 745 is constructed from an ending point 742 across all of the boundary curves. Since the momentum path is a straight line in a plane orthogonal to the w_perp plane, a projection of the starting and stopping point will coincide. Thus, a stop line will appear to coincide with the start line. However, the lines will exist on different layers of the projection, somewhat akin to a double layer bridge or highway, since start and stop points are at different distances along the w line For example, turning back to FIG. 3, if the starting point coincides with point 312 and the ending point at point 318, in three dimensional spaces the two points are clearly different points; once projected into two dimensional space, however, the starting point and the ending point seem to coincide.

After all of the roads are constructed, the intersections of the lines and curves can be calculated in step 210. The intersection represents where a solution path can change from one region of solutions to another region of solutions. Thus, intersection points act like freeway exit and on ramps to the roads. For example, the starting point 740 begins in first region 702. To move to second region 704, the movement can occur from line 743 to first boundary curve 710 where there is an intersection. Then, movement can occur along first boundary curve 710 to where one of the horizontal tangent lines 720 intersects the boundary curve. At this intersection, movement can occur along the horizontal tangent line 720 into the second region 704.

Once the roads and the intersections are constructed in the two dimensions, it needs to be determined which of these intersections also are intersections in three-dimensional space in step 212. The intersections, associated boundary curves, and horizontal lines in three dimensions then represent the road map.

Then, in step 214, the best path to take from start to finish, can be determined by an algorithm such as Dijkstra's algorithm. Dijkstra's algorithm is named after E. W. Dijkstra who developed an algorithm for finding the shortest path from a first point on a graph (the starting point 740) to a second point on the graph (the ending point 742). In this algorithm, the intersections are considered vertices in the graph and the boundary curves and horizontal curves are graph edges.

Figure 8:
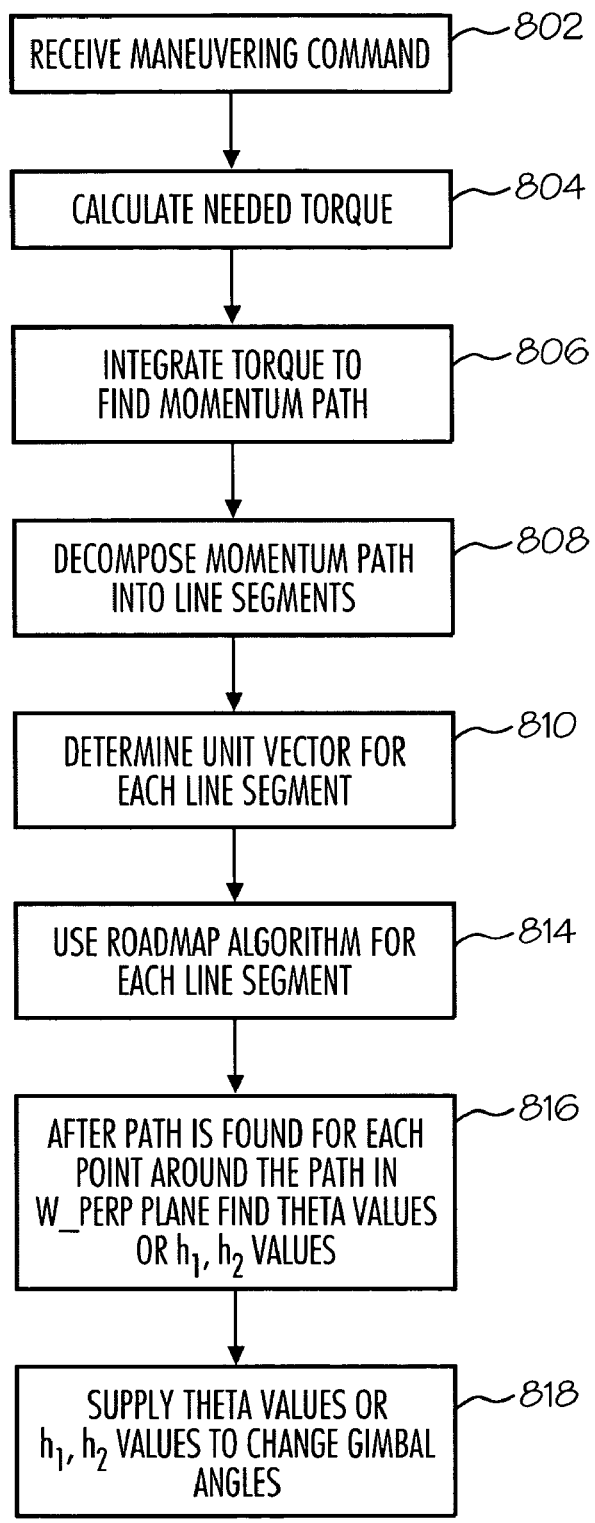
FIG. 8 is a flowchart illustrating a method for maneuvering a spacecraft in accordance with the teachings of the present invention.

FIG. 8 illustrates a method 800 for controlling a spacecraft in accordance with the teachings of the present invention. First, in step 802, a maneuvering command to rotate spacecraft orientation is received. In one exemplary embodiment, the maneuvering command is sent from a ground control station to the attitude control system 102 of the spacecraft Alternatively, the maneuvering command may be generated by the spacecraft based on a preplanned movement schedule.

After the maneuvering command is received, the torque as a function of time necessary to maneuver the spacecraft is calculated at the control system 100 in step 804. This can be done, in one embodiment, at the attitude control system 102.

In step 806, the torque calculated in step 804 is integrated to find a momentum path as a function of time. This calculation can be done at the attitude control system 102. In step 808, the momentum path is decomposed into a series of straight line segments. Next, for each of the individual line segments, it can then be determined if there is continuous path from a start point to an end point of each of the line segment The number of line segments needed to approximate a momentum path, depends on how accurately the series of line segments needs to approximate the original smooth momentum curve.

In step 810, for each of the line segment, a unit vector, w, is determined. As discussed previously, the momentum for a line segment can be expressed using the unit vector as:

$$h(t) = h_0 + t*w \quad (37)$$

Where t is a parameter, such as time, w is the unit vector, $h_0$ is a point at the beginning of the line segment Next, in step 814, the roadmap algorithm is used to determine if there is a path in the w_perp plane that connects the start and end points for a line segment. Then, if there is a path, in step 816, for each point along the path in the w_perp plane, the individual momentum vectors $h_1$ and $h_2$ for each line segment can be determined.

Given values for point [y,z] in plane perpendicular to w, equation $[y,z]=w\_perp'*(h_1+h_2)$ can be used to solve for individual momentum vectors $h_1$ and $h_2$. The full set of equations that need to be solved are:

$[y,z]=w\_perp'*(h_1+h_2)$ two linear equations in $h_1$ and $h_2$ $\|h_1\|^2 = h_1'*h_1$ quadratic in $h_1$ $\|h_2\|^2 = h_2'*h_2$ quadratic in $h_2$ $e_1'*h_1=0$ linear equation in $h_1$ $e_2'*h_2=0$ linear equation in $h_2$ \quad (38)

Since y, z, w_perp, $\|h_1\|^2$, $\|h_2\|^2$, $e_1$ and $e_2$ are known, we can solve the above six equations for the six unknown components of vectors $h_1$ and $h_2$. Since four of the above six equations are linear, they can be used to eliminate four of the variables, leaving two quadratic equations in two remaining variables. Using standard techniques, such as resultants, the two quadratic equations in two variables can be used to get a single quartic (degree 4) equation in one variable. Solving for the quartic equation's four roots, and then using back-substitution, the remaining five variables can be solved for. This gives four solutions for vectors $h_1$ and $h_2$.

Similarly, given values for point [y,z] in plane perpendicular to w, and given arbitrary values for momenta $h_5$ through $h_n$, equation $[y,z]=w\_perp'*(h_0-(h_3+h_4+h_5+ \ldots +h_n))$ can be used to solve for individual momentum vectors $h_3$ and $h_4$. The full set of equations that need to be solved are:

$$[y,z] = w\_perp'*(h_0-(h_3+h_4+h_5+\ldots+h_n))$$

two linear equations in unknown $h_3$ and $h_4$ $$\|h_3\|^2 = h_3'*h_3 \text{ quadratic in } h_3$$

$$\|h_4\|^2 = h_4'*h_4 \text{ quadratic in } h_4$$

$$e_3'*h_3 = 0 \text{ linear equations in } h_3$$

$$e_4'*h_4 = 0 \text{ linear equations in } h_4 \quad (39)$$

Since y, z, w_perp, $\|h_3\|^2$, $\|h_4\|^2$, $e_3$, $e_4$, $h_5$ through $h_n$, are known, we can solve the above six equations for the six unknown components of vectors $h_3$ and $h_4$. Since four of the above six equations are linear, they can be used to eliminate four of the variables, leaving two quadratic equations in two remaining variables. Using standard techniques, such as resultants, the two quadratic equations in two variables can be used to get a single quartic equation in one variable. Solving for the quartic equation's four roots, then using back-substitution, the remaining 5 variables can be solved for. This gives four solutions for vectors $h_3$ and $h_4$.

The above solution technique avoids using any trigonometry. An alternative solution technique is to write $h_1$ and $h_2$ as sums of constant vectors times the sine and cosine of gimbal angles $\theta_1$ and $\theta_2$, then solving the four linear equations above, along with the following two quadratic equations: $(\cos(\theta_1))^2 + (\sin(\theta_1))^2 = 1$ and $(\cos(\theta_2))^2 + (\sin(\theta_2))^2 = 1$.

Finally, the momentum vectors, can then be sent to the momentum actuator control processor 104 and the proper gimbal movements can be determined. If the values for $\theta_1$ and $\theta_2$ are determined in step 816, the gimbal angles can be changed based on the values determined for each point in the path in the w-perp plane, in step 818.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. A method for avoiding singularities in the movement of CMGs in an array of CMGs in a spacecraft comprising:
   receiving a command to adjust an orientation of the spacecraft the spacecraft orientation;
   computing a torque needed to satisfy the command;
   integrating the torque to determine a momentum path;
   approximating the momentum path with a plurality of straight line segments;
   for each line segment of the plurality of line segments:
      determining a unit vector along the straight line segments;
      determining if there is a continuous path connecting a starting point and an ending point of the line segment in a plane perpendicular to the unit vector;
      determining a set of momentum vectors; and
   calculating a required gimbal movement for the CMGs in the array of CMGs for the set of momentum vectors determined for each of the line segment.

2. The method of claim 1 wherein the step of determining a unit vector further comprising equating each line segment to a unit vector and a scalar parameter that moves along the line:

$$h(t) = h_0 + t*w$$

where h(t) is the momentum path for the line segment, t is a scalar parameter and w is the unit vector.

3. The method of claim 1 wherein the step of determining if there is a continuous path connecting a start point and an end point of the line segment in a plane perpendicular further comprises calculating a plane perpendicular to the unit vector, w_perp plane.

4. The method of claim 1 wherein the step of determining a set of momentum vectors further comprises calculating individual momentum vectors $h_1$ and $h_2$.

5. The method of claim 4 further comprising sending the momentum vectors to a momentum actuator control processor to determine the required gimbal movement.

6. The method of claim 1 wherein the step of determining if there is a continuous path connecting a start point and an end point of the line segment in a plane perpendicular further comprising:
   projecting a three-dimensional momentum space onto a two-dimensional plane to form a w_perp projection;
   determining boundary curves of the w_perp projection;
   connecting the boundary curves with a series of horizontal tangent lines, each of the horizontal tangent lines tangent to one of the boundary curves and extending though the boundary curves;
   connecting the boundary curves with a series of horizontal cusp lines, each of the cusp lines tangent to a cusp of one of the boundary curves and extending through the boundary curves;
   constructing a starting line from the starting point, the starting line crossing the w_perp projection;
   constructing an ending line from the ending path, the line crossing the w_perp projection;
   choosing as intersection points places where the boundary curves, the horizontal, the tangent lines, the cusp lines, the starting lines and the ending lines meet; and
   determining an optimal path from the starting point to the ending point utilizing the intersection points.

7. The method of claim 6 wherein the step of determining an optimal path further comprises using Dijkstra's algorithm to calculate the optimal path.

8. The method of claim 6 wherein the step of choosing as intersection points further comprises determining if the intersection points in two dimensions are also intersection in three-dimension.

9. The method of claim 6 wherein the step of projecting a three-dimensional momentum space onto a two-dimensional plane to form a w_perp projection further comprises projecting the momentum curve $h(t) = h_1 + h_2 + h_3 + h_4$ as $w\_perp'*(h_1+h_2)$ and $w\_perp'*(h_0-(h_3+h_4))$.

\* \* \* \* \*

UNITED STATES PATENT AND TRADEMARK OFFICE
CERTIFICATE OF CORRECTION

PATENT NO.        : 7,464,899 B2                                            Page 1 of 1
APPLICATION NO.   : 11/197047
DATED             : December 16, 2008
INVENTOR(S)       : Michael R. Elgersma et al.

It is certified that error appears in the above-identified patent and that said Letters Patent is hereby corrected as shown below:

Column 14, line 34, "though" should be changed to --through--.

Signed and Sealed this

Twelfth Day of May, 2009

JOHN DOLL
*Acting Director of the United States Patent and Trademark Office*